US012120759B2

(12) United States Patent
Lin

(10) Patent No.: US 12,120,759 B2
(45) Date of Patent: Oct. 15, 2024

(54) DATA TRANSMISSION METHOD, DATA TRANSMISSION APPARATUS, AND ELECTRONIC DEVICE

(71) Applicant: GUANGDONG OPPO MOBILE TELECOMMUNICATIONS CORP., LTD., Dongguan (CN)

(72) Inventor: Jinquan Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 350 days.

(21) Appl. No.: 17/866,004

(22) Filed: Jul. 15, 2022

(65) Prior Publication Data

US 2022/0353932 A1    Nov. 3, 2022

Related U.S. Application Data

(63) Continuation of application No. PCT/CN2021/073078, filed on Jan. 21, 2021.

(30) Foreign Application Priority Data

Feb. 25, 2020   (CN) .......................... 202010116692.1

(51) Int. Cl.
*H04W 76/14*  (2018.01)
*H04W 4/80*   (2018.01)
*H04W 76/25*  (2018.01)

(52) U.S. Cl.
CPC ............ *H04W 76/14* (2018.02); *H04W 4/80* (2018.02); *H04W 76/25* (2018.02)

(58) Field of Classification Search
CPC ....... H04W 4/80; H04W 76/10; H04W 76/14; H04W 76/25; H04W 84/18; H04W 4/30; Y02D 30/70

(Continued)

(56) References Cited

U.S. PATENT DOCUMENTS 6,801,501  B1   10/2004  Knightly et al.
10,149,340 B1   12/2018  Rabii et al.
(Continued)

FOREIGN PATENT DOCUMENTS

CN    102204327 A    9/2011
CN    105451369 A    3/2016
(Continued)

OTHER PUBLICATIONS

The Notice of Allowance dated Nov. 11, 2022 from Chinese patent application No. 202010116692.1.

(Continued)

*Primary Examiner* — Robert J Lopata
(74) *Attorney, Agent, or Firm* — Quarles & Brady LLP

(57) ABSTRACT

Disclosed in the present application are a data transmission method, a data transmission apparatus, an electronic device, and a computer-readable storage medium, wherein the method includes: establishing a BLUETOOTH connection with a BLUETOOTH device; creating and initializing a first rate parameter, a second rate parameter, a first connection interval parameter, and a second connection interval parameter; based on the second connection interval parameter, performing data transmission with the BLUETOOTH device within a preset time length and updating the second rate parameter through an average transmission rate within the time length; comparing the first rate parameter with the second rate parameter; if the first rate parameter is less than the second rate parameter, updating each parameter and returning to a step relating to the data transmission and following steps; or else, maintaining the BLUETOOTH connection with the BLUETOOTH device based on the first connection interval parameter.

20 Claims, 4 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2011/0021142 A1 | 1/2011 | Desai | |
| 2016/0014550 A1 | 1/2016 | Chiddarwar et al. | |
| 2016/0261510 A1* | 9/2016 | Burnette | H04L 43/0888 |
| 2018/0199214 A1 | 7/2018 | Shen | |
| 2019/0320478 A1* | 10/2019 | Chen | H04W 12/71 |
| 2020/0396681 A1* | 12/2020 | Murali | H04L 9/0825 |
| 2021/0044680 A1* | 2/2021 | Kang | H04L 69/24 |
| 2021/0153269 A1* | 5/2021 | Kuenzi | H04W 76/14 |
| 2021/0243274 A1* | 8/2021 | Thomas | H04W 4/40 |
| 2021/0306832 A1* | 9/2021 | Juntunen | H04W 4/80 |
| 2022/0015191 A1* | 1/2022 | Yuan | H04W 48/16 |
| 2022/0394794 A1* | 12/2022 | Zhang | H04W 76/15 |

FOREIGN PATENT DOCUMENTS

| | | |
|---|---|---|
| CN | 105978663 A | 9/2016 |
| CN | 106255040 A | 12/2016 |
| CN | 106535104 A | 3/2017 |
| CN | 107000687 A | 8/2017 |
| CN | 108011780 A | 5/2018 |
| CN | 109104714 A | 12/2018 |
| CN | 109275131 A | 1/2019 |
| CN | 110248341 A | 9/2019 |
| CN | 110337095 A | 10/2019 |
| CN | 111328059 A | 6/2020 |
| JP | H09153000 A | 6/1997 |

OTHER PUBLICATIONS

The supplementary European search report dated May 26, 2023 from European patent application No. 21760480.0.
International Search Report and Written Opinion Dated Apr. 1, 2021 from PCT Application No. PCT/CN2021/073078.
The First Office Action with search report Dated Jul. 5, 2022 from Chinese patent Application No. 202010116692.1.
Zou Xiangyang et al, "Research on BLE Bluetooth Low Energy in Wireless Sensor Nodes" from Modern Electronic Technique Issue No. 20, published on Oct. 15, 2016, the whole document.

* cited by examiner

DATA TRANSMISSION METHOD, DATA TRANSMISSION APPARATUS, AND ELECTRONIC DEVICE

CROSS-REFERENCE TO RELATED APPLICATIONS

This application is a US National Phase application based upon International Application No. PCT/CN2021/073078, filed on Jan. 21, 2021, which claims priority benefit to Chinese Patent Application No. 202010116692.1 filed on Feb. 25, 2020, titled "DATA TRANSMISSION METHOD, DATA TRANSMISSION APPARATUS, AND ELECTRONIC DEVICE", the entire contents of which are hereby incorporated by reference in its entirety in this application.

FIELD OF DISCLOSURE

The present application relates to BLUETOOTH technology, and more specifically, to a data transmission method, a data transmission apparatus, an electronic device, and a computer-readable storage medium.

BACKGROUND

BLUETOOTH technology is a widely used short-range wireless connection technology, which is still under constant optimization. In recent years, a BLUETOOTH Low Energy (BLE) function has been added to BLUETOOTH 4.0 version released by BLUETOOTH. This BLE function is mainly used in scenarios with high real-time requirements and low transmission rate requirements, such as devices like sphygmomanometers, keyboards, mice, etc. However, an application range of current BLE is wider and wider, and can even be applied to scenarios such as big data transmission. For example, BLE technology is used to upgrade firmware of peripheral devices. Based on this, considering that users have higher and higher requirements for transmission rates, the existing BLE technology has been unable to meet requirements of users.

SUMMARY

The present application provides a data transmission method, a data transmission apparatus, an electronic device, and a computer-readable storage medium, which may realize high-speed data transmission under a BLUETOOTH connection state.

In a first aspect, the present application provides a data transmission method, and the data transmission method is applied to an electronic device with a BLUETOOTH function. The data transmission method includes:
 establishing a BLUETOOTH connection with a BLUETOOTH device;
 creating and initializing a first rate parameter, a second rate parameter, a first connection interval parameter, and a second connection interval parameter, wherein the first rate parameter is used to record a maximum transmission rate, and the second rate parameter is used to indicate an average transmission rate in a data transmission process; the first connection interval parameter is used to record a connection interval relating to the first rate parameter, and the second connection interval parameter is used to dynamically adjust a connection interval used in the data transmission process;
 based on the second connection interval parameter, performing data transmission with the BLUETOOTH device within a preset time length, and updating the second rate parameter through the average transmission rate within the time length;
 comparing the first rate parameter with the second rate parameter;
 if the first rate parameter is less than the second rate parameter, updating the first rate parameter, the first connection interval parameter, and the second connection interval parameter, returning to execute the step of performing the data transmission with the BLUETOOTH device within a preset time length, and updating the second rate parameter through the average transmission rate within the time length based on the second connection interval parameter, and following steps; and
 if the first rate parameter is greater than or equal to the second rate parameter, maintaining the BLUETOOTH connection with the BLUETOOTH device based on the first connection interval parameter.

In a second aspect, the present application provides a data transmission apparatus, and the data transmission apparatus is applied to an electronic device with a BLUETOOTH function. The data transmission apparatus includes:
 a connection establishing unit configured to establish a BLUETOOTH connection with a BLUETOOTH device;
 a parameter creation unit configured to create and initialize a first rate parameter, a second rate parameter, a first connection interval parameter, and a second connection interval parameter, wherein the first rate parameter is used to record a maximum transmission rate, and the second rate parameter is used to indicate an average transmission rate in a data transmission process, the first connection interval parameter is used to record a connection interval relating to the first rate parameter, and the second connection interval parameter is used to dynamically adjust a connection interval used in the data transmission process;
 a first update unit configured to based on the second connection interval parameter, perform data transmission with the BLUETOOTH device within a preset time length, and update the second rate parameter through the average transmission rate within the time length;
 a parameter comparison unit configured to compare the first rate parameter with the second rate parameter;
 a second update unit configured to if the first rate parameter is less than the second rate parameter, update the first rate parameter, the first connection interval parameter, and the second connection interval parameter, and trigger execution of the first update unit;
 a connection maintaining unit configured to if the first rate parameter is greater than or equal to the second rate parameter, maintain the BLUETOOTH connection with the BLUETOOTH device based on the first connection interval parameter.

In a third aspect, the present application provides an electronic device including a memory, a processor, and a computer program stored in the memory and running on the processor. The processor implements a data transmission method as described in any item of the aforementioned first aspect, when executing the computer program.

In a fourth aspect, the present application provides a computer-readable storage medium storing a computer program. When executed by a processor, the computer program implements a data transmission method as described in any item of the aforementioned first aspect.

In a fifth aspect, the present application provides a computer program product. When running on an electronic device, the computer program product implements a data transmission method as described in any item of the aforementioned first aspect.

BRIEF DESCRIPTION OF DRAWINGS

In order to illustrate technical solutions in an embodiment of the present application more clearly, the accompanying drawings that need to be used in the description of the embodiment or the prior art will be briefly introduced below. Obviously, the accompanying drawings in the following description are merely some embodiments of the present application. For those skilled in the art, other drawings can also be obtained based on these drawings without any creative effort.

DETAILED DESCRIPTION

In the following description, for illustration rather than limitation, specific details such as specific system structures and technologies are set forth in order to provide a thorough understanding of an embodiment of the present application. However, it will be apparent to those skilled in the art that the present application may be implemented in other embodiments without these specific details. In other instances, detailed descriptions of well-known systems, devices, circuits, and methods are omitted so as not to obscure the description of the present application with unnecessary detail.

In order to illustrate the technical solutions proposed by the present application, the following specific embodiments will be described.

Embodiment 1

Figure 1:
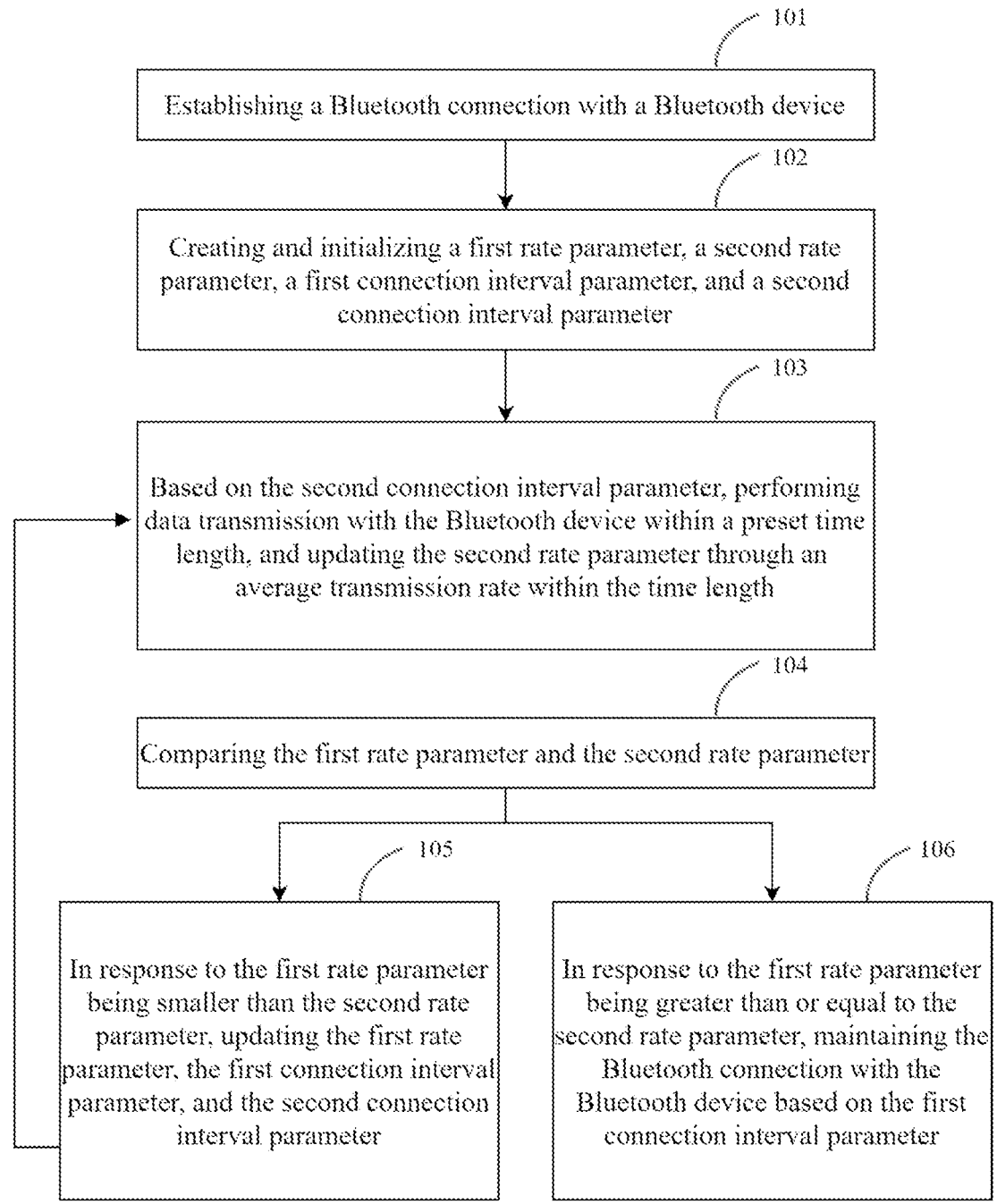
FIG. 1 is a flowchart diagram of implementation of a data transmission method provided by an embodiment of the present application.

A data transmission method provided by an embodiment of the present application is described below. Please refer to FIG. 1. The data transmission method in the embodiment of the present application is applied to an electronic device with a BLUETOOTH function, and the data transmission method includes:

Step 101, a BLUETOOTH connection with a BLUETOOTH device is established.

In the embodiment of the present application, in order to facilitate distinction, another electronic device with the BLUETOOTH function is denoted as the BLUETOOTH device, and then the electronic device can first establish the BLUETOOTH connection with the BLUETOOTH device. For example, when a device A establishes the BLUETOOTH connection with a device B, from a perspective of the device A, the device B will be used as the BLUETOOTH device, and the device A itself will be used as the electronic device to apply a solution of the embodiment of the present application. From a perspective of the device B, the device A will be used as the BLUETOOTH device, and the device B itself will be used as the electronic device to apply the solution of the embodiment of the present application. That is, the electronic device and the BLUETOOTH device in the embodiment are relative concepts rather than absolute concepts. Specifically, the BLUETOOTH connection refers to a BLUETOOTH connection established through an Asynchronous Connectionless (ACL) link of BLUETOOTH Low Energy (BLE).

Step 102, a first rate parameter, a second rate parameter, a first connection interval parameter, and a second connection interval parameter are created and initialized.

In the embodiment of the present application, several parameters can be created in a local cache area of the electronic device mentioned above, including the first rate parameter, the second rate parameter, the first connection interval parameter, and the second connection interval parameter. After being created, these parameters are initialized. The first rate parameter is used to record a maximum transmission rate, and the second rate parameter is used to indicate a current transmission rate; and the first connection interval parameter is used to record a connection interval (CI) relating to the first rate parameter, and the second connection interval parameter is used to dynamically adjust a connection interval used in a data transmission process. Specifically, the first rate parameter, the second rate parameter, and the first connection interval parameter are all initialized to 0, and the second connection interval parameter is initialized to a preset minimum value of a connection interval parameter. The minimum value of the connection interval parameter is usually 7.5 milliseconds (ms). Of course, the minimum value of the second connection interval parameter can also be set to other values by a developer or a user, which is not limited here.

Step 103, based on the connection interval parameter mentioned above, data transmission with the BLUETOOTH device is performed within a preset time length, and the second rate parameter is updated through the average transmission rate within the time length.

In the embodiment of the present application, the BLE technology uses a frequency hopping mechanism in a connection of two devices. The two devices use a specific channel to send and receive data, and then switch a physical channel after each connection interval. Affected by a memory size, the device cannot send packets indefinitely within the connection interval, so a size of the connection interval directly affects a transmission rate: under circumstances that the connection interval is too small, frequency hopping will start before data has been completely sent; under circumstances that the connection interval is too large, an air interface time accounts for a large proportion, which will cause a waste of bandwidth. Therefore, an appropriate connection interval can achieve balance between the frequency hopping and the bandwidth, and improve the transmission rate. Based on this, in the embodiment of the present application, the second connection interval parameter is initialized to the minimum value of the connection interval parameter. Starting from the minimum value of the connection interval parameter, the data transmission with the BLUETOOTH device is performed within the preset time length to obtain the average transmission rate within the time length. The average transmission rate in the time length is assigned to the second rate parameter. That is, the average transmission rate indicated by the second rate parameter specifically refers to an average transmission rate within a most recent data transmission cycle (i.e., a previous time length). Optionally, the time length can be set to 10 seconds. Of course, the time length can also be set to other values by the user or the developer, which is not limited here.

Step 104, the first rate parameter is compared with the second rate parameter.

In the embodiment of the present application, because what the first rate parameter records is the maximum transmission rate in the data transmission process of the BLUETOOTH connection until a current moment, at this time, the first rate parameter mentioned above and the second rate parameter mentioned above can be compared to determine whether the first rate parameter needs to be updated.

Step 105, if the first rate parameter is less than the second rate parameter, the first rate parameter, the first connection interval parameter, and the second connection interval parameter are updated, and the process returns to execute the step of performing the data transmission with the BLUETOOTH device within the preset time length, and updating the second rate parameter through the average transmission rate within the time length based on the second connection interval parameter, and subsequent steps.

In the embodiment of the present application, if the first rate parameter mentioned above is found to be less than the second rate parameter mentioned above by comparison, that is, in this case, the average transmission rate in the most recent data transmission cycle is greater than a currently recorded maximum transmission rate, then the first rate parameter mentioned above needs to be updated based on the second rate parameter mentioned above. Specifically, a value of the second rate parameter is assigned to the first rate parameter. In addition to the first rate parameter, since the first connection interval parameter records the connection interval relating to the first rate parameter, a value of the second connection interval parameter mentioned above can be assigned to the first connection interval parameter mentioned above to realize updating the first connection interval parameter. In addition, considering that a new connection interval needs to be used for the data transmission in a next time length, the second connection interval parameter mentioned above can be updated based on a preset connection interval unit value. Specifically, the value of the second connection interval parameter before the updating is added to the connection interval unit value to obtain an updated second connection interval parameter. The connection interval unit value is preferably 1.25 ms. It should be noted that, in this step, the first connection interval parameter must be updated first, and then the second connection interval parameter is updated.

Considering that the average transmission rate tends to show a law of first increasing and then decreasing with an increase of the connection interval, before reaching a theoretical maximum transmission rate, with the increase of the connection interval, the average transmission rate also increases continuously. At this time, updating the first rate parameter through the average transmission rate can make the first rate parameter continuously approach the theoretical maximum transmission rate mentioned above. Therefore, when a change trend of the first rate parameter is still in an increasing stage, each time an update of the first rate parameter mentioned above, the first connection interval parameter mentioned above, and the second connection interval parameter mentioned above is completed, the process returns to the step 103 and the subsequent steps.

Step 106, if the first rate parameter is greater than or equal to the second rate parameter mention above, the BLUETOOTH connection with the BLUETOOTH device mentioned above is maintained based on the first connection interval parameter.

In the embodiment of the present application, once the first rate parameter is found to be greater than or equal to the second rate parameter, it can be considered that the transmission rate corresponding to a current second connection interval parameter has entered a decreasing stage. At this time, it can be known that the transmission rate (i.e., a current first rate parameter) corresponding to a previous second connection interval parameter (i.e., a current first connection interval parameter) is closest to the theoretical maximum transmission rate. Therefore, at this time, the BLUETOOTH connection with the BLUETOOTH device can be maintained based on the current first connection interval parameter. That is, all subsequent data transmission with the BLUETOOTH device is performed based on the current first connection interval parameter.

Figure 2:
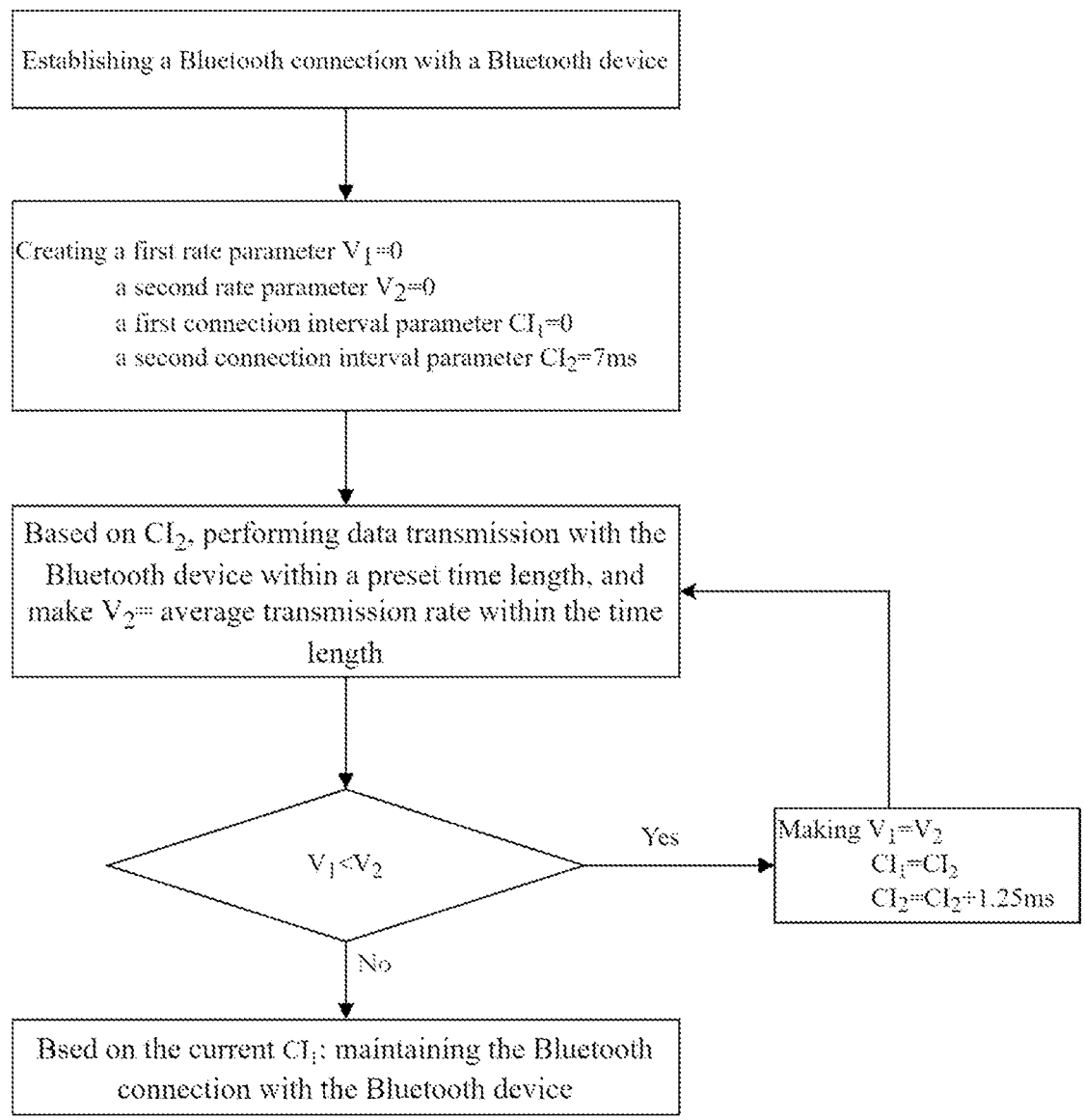
FIG. 2 is a logic diagram of the data transmission method provided by an embodiment of the present application.

In order to facilitate understanding, please refer to FIG. 2, FIG. 2 shows a logic diagram of the above steps 101 to 106.

Optionally, in order to improve processing efficiency of the embodiment of the present application, after the step 101, the above-mentioned data transmission method also includes:

detecting whether it is a first time for the electronic device to establish the BLUETOOTH connection with the BLUETOOTH device;

correspondingly, the creating and initializing the first rate parameter, the second rate parameter, the first connection interval parameter, and the second connection interval parameter including:

if it is the first time for the electronic device to establish the BLUETOOTH connection with the BLUETOOTH device, creating and initializing the first rate parameter, the second rate parameter, the first connection interval parameter, and the second connection interval parameter;

if it is not the first time for the electronic device to establish the BLUETOOTH connection with the BLUETOOTH device, obtaining a device identification code of the BLUETOOTH device, and searching for the first connection interval parameter relating to the device identification code in local of the electronic device based on the device identification code to realize the data transmission with the BLUETOOTH device based on the first connection interval parameter.

In the embodiment of the present application, only when it is the first time for the electronic device to establish the BLUETOOTH connection with the BLUETOOTH device, the first rate parameter, the second rate parameter, the first connection interval parameter, and the second connection interval parameter need to be created and initialized. Further, in the process of data transmission performed through the BLUETOOTH connection for the first time, the device identification code of the BLUETOOTH device can also be obtained, and an association relationship between the finally determined first connection interval parameter (i.e., the connection interval parameter closest to the theoretical maximum transmission rate) mentioned above and the device identification code mentioned above is established, and the association relationship is stored in the local of the electronic device. In this way, when the electronic device establishes the BLUETOOTH connection with the same BLUETOOTH device subsequently, the first connection interval parameter related can be searched in the local through the device identification code of the BLUETOOTH device, so as to realize the data transmission with the BLUETOOTH device based on the first connection interval parameter. For example, when the device A and the device B are connected for the first time, the device A determines the first connection interval parameter as X1 through the above steps 101 to 106. That is, under the first connection interval parameter X1, the transmission rate between the device A and the device B is highest. The device A may associate the device B with the first connection interval parameter X1 and then store it in the local. Subsequently, when the device A connects to the device B, the device A directly searches for the first connection interval parameter X1 relating to the device B in the local and performs the data transmission with the device B based on the connection interval indicated by the first connection interval parameter X1. It can be seen that in this way, processing pressure of the BLUETOOTH device can be reduced to a certain extent, and it prevents researching for the connection interval that can achieve the maximum transmission rate each time the BLUETOOTH connection is established with other devices, which helps the data transmission between the electronic device and the BLUETOOTH device to reach the maximum transmission rate.

Optionally, in addition to dynamically adjusting the connection interval to obtain the maximum transmission rate, the transmission rate can also be improved in other ways. Thus, after the above-mentioned establishing the BLUETOOTH connection with the BLUETOOTH device, the data transmission method mentioned above also includes:

detecting whether the electronic device mentioned above and the BLUETOOTH device mentioned above support a preset first BLUETOOTH version;

if both the electronic device mentioned above and the BLUETOOTH device mentioned above support the preset first BLUETOOTH version, activating a high-speed encoding function by setting a preset first flag bit to enable high-speed encoding of a physical layer, and activating a data length extension function by setting a preset second flag bit;

if the electronic device mentioned above and/or the BLUETOOTH device mentioned above do not support the preset first BLUETOOTH version, detecting whether the electronic device mentioned above and the BLUETOOTH device mentioned above support a preset second BLUETOOTH version, wherein the second BLUETOOTH version mentioned above is lower than the first BLUETOOTH version mentioned above;

if both the electronic device mentioned above and the BLUETOOTH device mentioned above support the preset second BLUETOOTH version, activating the data length extension function by setting the second flag bit.

In the embodiment of the present application, the first BLUETOOTH version mentioned above is specifically a 5.0 version, and the second BLUETOOTH version mentioned above is specifically a 4.2 version. The 5.0 version not only supports the high-speed encoding function, but also supports the data length extension function. The 4.2 version does not support the high-speed encoding function, and only supports the data length extension function. The high-speed encoding function mentioned above specifically refers to the physical layer encoding at a speed of 2 Mb/s, which can greatly improve the transmission rate compared to the physical layer encoding at a speed of 1 Mb/s when the high-speed encoding function is not applied. The data length extension function allows a BLE controller to send packets with up to 251 bytes in a connected state, which can greatly improve the transmission rate compared to a maximum payload of 27 bytes of a data channel of the BLE controller when the data length extension function is not applied. Based on this, after the electronic device and the BLUETOOTH device establish the BLUETOOTH connection, the two devices can exchange version numbers. That is, the BLUETOOTH device sends the version number of the BLUETOOTH device to the electronic device, and the electronic device sends the version number of the electronic device to the BLUETOOTH device. By analyzing the version numbers of an opposite terminal and a local terminal, it is known whether the opposite terminal and the local terminal support the first BLUETOOTH version. If both of the two devices support the first BLUETOOTH version, the high-speed encoding function can be activated by setting the preset first flag bit, and at a same time, the data length extension function can also be activated by setting the preset second flag bit. If any one of the two devices does not support the first BLUETOOTH version, continue to detect whether the two devices support the second BLUETOOTH version. Under circumstances that both of the two devices support the second BLUETOOTH version, the data length extension function can be activated by setting the preset second flag bit.

Optionally, in addition to dynamically adjusting the connection interval to obtain the maximum transmission rate, activating the high-speed encoding function, and activating the data length extension function, the transmission rate can also be improved by other means. Thus, after the above-mentioned establishing the BLUETOOTH connection with the BLUETOOTH device, the data transmission method mentioned above also includes:

obtaining a maximum transmission unit size supported by the BLUETOOTH device mentioned above as a target size, the target size mentioned above is used for indicating a size of a data package transmitted by the electronic device mentioned above to the BLUETOOTH device mentioned above.

In the embodiment of the present application, the maximum transmission unit size (MTU size) refers to a length of an entire ATT data packet. The ATT data package mentioned above is a data package based on an attribute protocol of an upper-layer protocol stack of the BLE. A minimum value of the maximum transmission unit size mentioned above is 23, and a maximum value of the maximum transmission unit size is not specified. Generally speaking, the larger an MTU is, the less a proportion of a packet header in each corresponding data packet is, which will improve the data transmission rate. Based on this, before the electronic device and the BLUETOOTH device start the data transmission, the maximum transmission unit size of the opposite terminal can be obtained first, and during the data transmission, the size of each data packet to be transmitted is determined according to the maximum transmission unit size of the opposite terminal. That is, the electronic device obtains the maximum transmission unit size L1 of the BLUETOOTH device, and the BLUETOOTH device obtains the maximum transmission unit size L2 of the electronic device. When the electronic device performs the data transmission, the size of the data packet transmitted to the BLUETOOTH device is L1. When the BLUETOOTH device performs the data transmission, the size of the data packet transmitted to the electronic device is L2. Similar to the first connection interval parameter mentioned above, the target size mentioned above can be added to the association relationship between the first connection interval parameter and the device identification code of the BLUETOOTH device mentioned above. That is, the association relationship of the device identification code of the BLUETOOTH device, the first connection interval parameter, and the target size is established. Then, when the connection with the same BLUETOOTH device is established again subsequently, the corresponding first connection interval parameter and target size can be directly obtained for data transmission.

As seen from the above, in the embodiment of the present application, the connection interval parameter that can achieve the maximum transmission rate is determined by dynamically adjusting the connection interval, and after obtaining the connection interval parameter that can achieve the maximum transmission rate, the connection interval parameter is maintained to perform BLUETOOTH data connection, so as to achieve high-speed data transmission. In addition, the maximum transmission unit size supported by the two devices can be exchanged, and the data packet can be transmitted to the opposite terminal with the maximum transmission unit size supported by the opposite terminal, which can also achieve the high-speed data transmission. Further, under circumstances that both of the two devices support, the high-speed encoding function and the data length extension function are activated, so as to further achieve the high-speed data transmission.

It should be understood that the sequence number of each step in the above-described embodiment does not mean an execution order. The execution order of each process should be determined by its function and internal logic, and should not construct any limitation to the implementation process of the embodiment of the present application.

Embodiment 2

Figure 3:
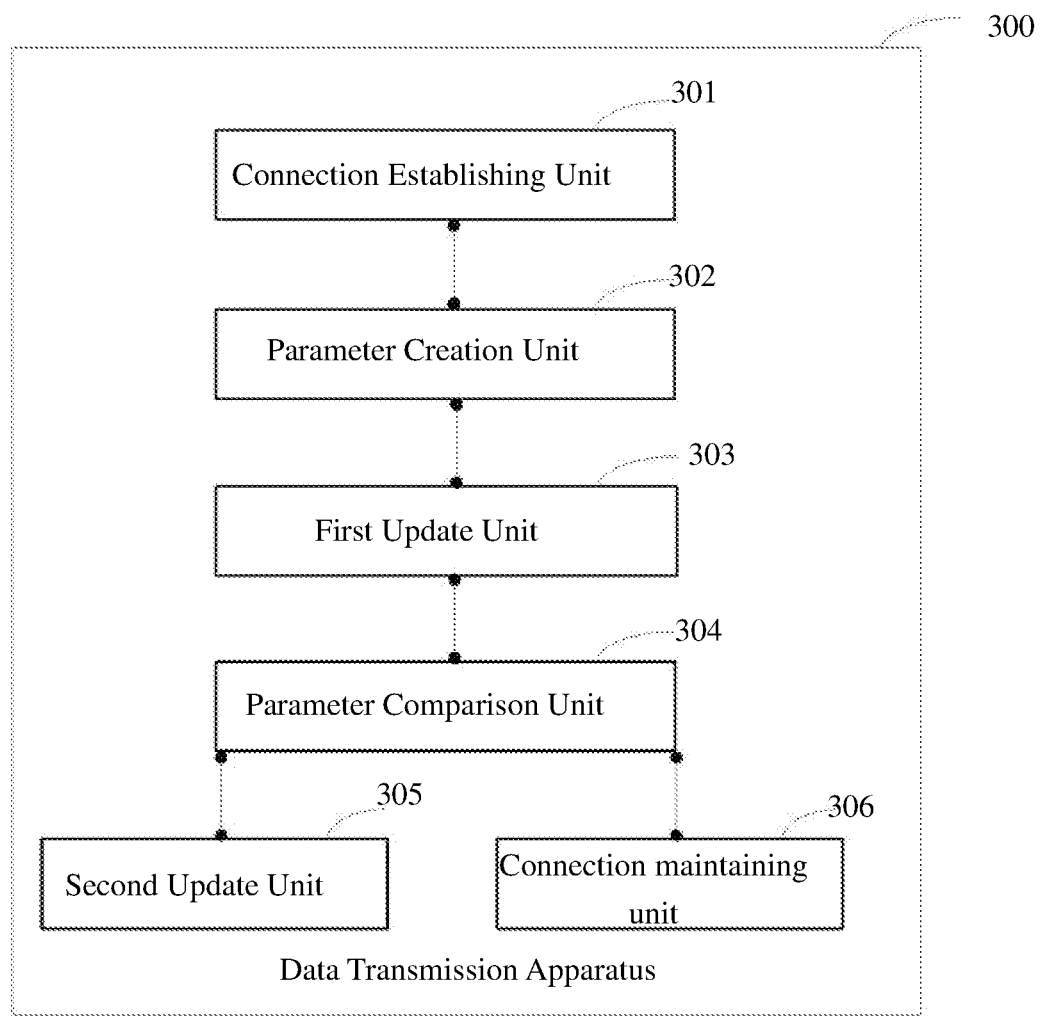
FIG. 3 is a structural diagram of a data transmission apparatus provided by an embodiment of the present application.

Embodiment 2 of the present application provides a data transmission apparatus, and the above data transmission apparatus can be integrated into an electronic device with a BLUETOOTH function. As shown in FIG. 3, the data transmission apparatus 300 in the embodiment of the present application includes:

a connection establishing unit 301, configured to establish a BLUETOOTH connection with a BLUETOOTH device;

a parameter creation unit 302, configured to create and initialize a first rate parameter, a second rate parameter, a first connection interval parameter, and a second connection interval parameter, wherein the first rate parameter is used to record a maximum transmission rate, and the second rate parameter is used to indicate an average transmission rate in a data transmission process; the first connection interval parameter is used to record a connection interval relating to the first rate parameter, and the second connection interval parameter is used to dynamically adjust a connection interval used in the data transmission process;

a first update unit 303, configured to perform data transmission with the BLUETOOTH device mentioned above within a preset time length and update the second rate parameter mentioned above through an average transmission rate within the time length mentioned above based on the second connection interval parameter;

a parameter comparison unit 304, configured to compare the first rate parameter mentioned above with the second rate parameter mentioned above;

a second update unit 305, configured to if the first rate parameter mentioned above is less than the second rate parameter mentioned above, update the first rate parameter mentioned above, the first connection interval parameter mentioned above, and the second connection interval parameter mentioned above, and trigger execution of the first update unit 303 mentioned above;

a connection maintaining unit 306, configured to maintain the BLUETOOTH connection with the BLUETOOTH device mentioned above based on the first connection interval parameter mentioned above if the first rate parameter mentioned above is greater than or equal to the second rate parameter mentioned above.

Optionally, the data transmission apparatus 300 mentioned above also includes:

a connection times detection unit, configured to, after the connection establishing unit 301 mentioned above establishes the BLUETOOTH connection with the BLUETOOTH device, detect whether it is a first time for the electronic device mentioned above to establish the BLUETOOTH connection with the BLUETOOTH device mentioned above.

Correspondingly, the parameter creation unit 302 mentioned above is specifically configured to: if it is the first time for the electronic device mentioned above to establish the BLUETOOTH connection with the BLUETOOTH device mentioned above, create and initialize the first rate parameter, the second rate parameter, the first connection interval parameter, and the second connection interval parameter; if it is not the first time for the electronic device mentioned above to establish the BLUETOOTH connection with the BLUETOOTH device mentioned above, obtain a device identification code of the BLUETOOTH device mentioned above, and search for the first connection interval parameter relating to the device identification code mentioned above in local of the electronic device mentioned above based on the device identification code mentioned above to realize the data transmission with the BLUETOOTH device mentioned above based on the first connection interval parameter mentioned above.

Optionally, the data transmission apparatus 300 mentioned above also includes:

a device identification code obtaining unit, configured to obtain the device identification code of the BLUETOOTH device mentioned above;

an association relationship detection unit, configured to establish an association relationship between the first connection interval parameter mentioned above and the device identification code mentioned above;

an association relationship storage unit, configured to store the association relationship mentioned above.

Optionally, the data transmission apparatus 300 mentioned above also includes:

a first version detection unit, configured to, after the connection establishing unit 301 mentioned above establishes the BLUETOOTH connection with the BLUETOOTH device, detect whether the electronic device mentioned above and the BLUETOOTH device mentioned above support a preset first BLUETOOTH version;

a first function activation unit, configured to activate a high-speed encoding function by setting a preset first flag bit to enable high-speed encoding of a physical layer, and activate a data length extension function by setting a preset second flag bit if both the electronic device mentioned above and the BLUETOOTH device mentioned above support the preset first BLUETOOTH version.

Optionally, the data transmission apparatus 300 mentioned above also includes:

a second version detection unit, configured to, after the first version detection unit mentioned above detects whether the electronic device mentioned above and the BLUETOOTH device mentioned above support a preset first BLUETOOTH version, detect whether the electronic device mentioned above and the BLUETOOTH device mentioned above support a preset second BLUETOOTH version if the electronic device mentioned above and/or the BLUETOOTH device mentioned above do not support the preset first BLUETOOTH version, wherein the second BLUETOOTH version mentioned above is lower than the first BLUETOOTH version mentioned above;

a second function activation unit, configured to activate the data length extension function by setting the second flag bit mentioned above if both the electronic device mentioned above and the BLUETOOTH device mentioned above support the preset second BLUETOOTH version.

Optionally, the data transmission apparatus 300 mentioned above also includes:

a target size determination unit, configured to, after the connection establishing unit 301 mentioned above establishes the BLUETOOTH connection with the BLUETOOTH device, obtain a maximum transmission unit size supported by the BLUETOOTH device mentioned above as a target size, the target size mentioned above is used for indicating a size of a data package transmitted by the electronic device mentioned above to the BLUETOOTH device mentioned above.

Optionally, the second update unit 305 mentioned above includes:

a first rate parameter update subunit, configured to update the first rate parameter mentioned above based on the second rate parameter mentioned above;

a first connection interval parameter update subunit, configured to update the first connection interval parameter mentioned above based on the second connection interval parameter mentioned above;

a second connection interval parameter update subunit, configured to update the second connection interval parameter mentioned above based on a preset connection interval unit value.

As seen from the above, in the embodiment of the present application, the data transmission apparatus determines the connection interval parameter that can achieve the maximum transmission rate by dynamically adjusting the connection interval, and after obtaining the connection interval parameter that can achieve the maximum transmission rate, the connection interval is maintained to perform BLUETOOTH data connection, so as to achieve high-speed data transmission. In addition, the maximum transmission unit size supported by the two devices can be exchanged, and the data packet can be transmitted to an opposite terminal with the maximum transmission unit size supported by the opposite terminal, which can also achieve the high-speed data transmission. Further, under the circumstances that both of the two devices support, the high-speed encoding function and the data length extension function are activated, so as to further achieve the high-speed data transmission.

Embodiment 3

Figure 4:
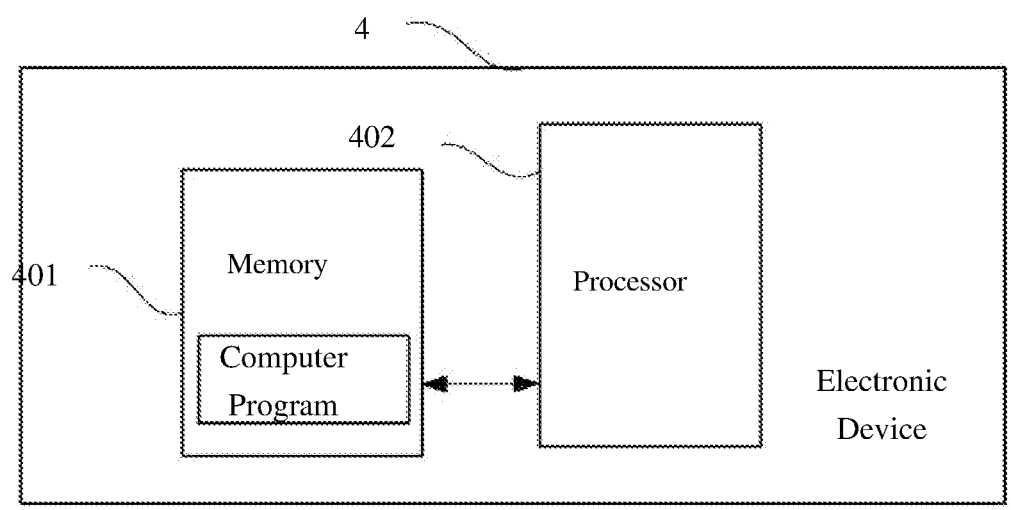
FIG. 4 is a structural schematic diagram of an electronic device provided by an embodiment of the present application.

Embodiment 3 of the present application provides an electronic device. Please refer to FIG. 4, the electronic device 4 in the embodiment of the present application has a BLUETOOTH function, and the electronic device includes: a memory 401, one or more processors 402 (FIG. 4 merely shows one processor), and a computer program stored in the memory 401 and executable on the processor. The memory 401 is used to store software programs and units, and the processor 402 executes various functional applications and data processing by running the software programs and units stored in the memory 401 to obtain resources corresponding to the above-mentioned preset events. Specifically, the processor 402 implements following steps by running the computer program stored in the memory 401:

establishing a BLUETOOTH connection with a BLUETOOTH device;

creating and initializing a first rate parameter, a second rate parameter, a first connection interval parameter, and a second connection interval parameter, wherein the first rate parameter mentioned above is used to record a maximum transmission rate, and the second rate parameter mentioned above is used to indicate an average transmission rate in a data transmission process; the first connection interval parameter mentioned above is used to record a connection interval relating to the first rate parameter, and the second connection interval parameter mentioned above is used to dynamically adjust a connection interval used in the data transmission process;

based on the second connection interval parameter mentioned above, performing data transmission with the BLUETOOTH device mentioned above within a preset time length and updating the second rate parameter mentioned above through the average transmission rate within the time length mentioned above;

comparing the first rate parameter mentioned above with the second rate parameter mentioned above;

if the first rate parameter mentioned above is less than the second rate parameter mentioned above, updating the first rate parameter mentioned above, the first connection interval parameter mentioned above, and the second connection interval parameter mentioned above and returning to execute the step of performing data transmission with the BLUETOOTH device mentioned above within the preset time length, and updating the second rate parameter mentioned above through the average transmission rate within the time length mentioned above based on the second connection interval parameter mentioned above, and following steps;

if the first rate parameter mentioned above is greater than or equal to the second rate parameter mentioned above, maintaining the BLUETOOTH connection mentioned above with the BLUETOOTH device based on the first connection interval parameter mentioned above.

Assuming that the above is a first possible implementation manner, in a second possible implementation manner provided on the basis of the first possible implementation manner, after establishing the BLUETOOTH connection with the BLUETOOTH device, the processor 402 further implements the following steps by running the computer program mentioned above stored in the memory 401:

detecting whether it is a first time for the electronic device mentioned above to establish the BLUETOOTH connection with the BLUETOOTH device mentioned above;

correspondingly, the creating and initializing the first rate parameter, the second rate parameter, the first connection interval parameter, and the second connection interval parameter mentioned above comprising:

if it is the first time for the electronic device mentioned above to establish the BLUETOOTH connection with the BLUETOOTH device mentioned above, creating and initializing the first rate parameter, the second rate parameter, the first connection interval parameter, and the second connection interval parameter;

if it is not the first time for the electronic device mentioned above to establish the BLUETOOTH connection with the BLUETOOTH device mentioned above, obtaining a device identification code of the BLUETOOTH device mentioned above and searching for the first connection interval parameter relating to the device identification code mentioned above in local of the electronic device mentioned above based on the device identification code mentioned above to realize the data transmission with the BLUETOOTH device mentioned above based on the first connection interval parameter mentioned above.

In a third possible implementation manner provided on the basis of the second possible implementation manner mentioned above, after maintaining the BLUETOOTH connection with the BLUETOOTH device mentioned above based on the first connection interval parameter mentioned above, the processor 402 further implements the following steps by running the computer program mentioned above stored in the memory 401:

obtaining the device identification code of the BLUETOOTH device;

establishing an association relationship between the first connection interval parameter mentioned above and the device identification code mentioned above;

storing the association relationship mentioned above.

In a fourth possible implementation manner provided on the basis of one possible implementation manner as described above, after establishing the BLUETOOTH connection with the BLUETOOTH device, the processor 402 further implements the following steps by running the computer program mentioned above stored in the memory 401:

detecting whether the electronic device mentioned above and the BLUETOOTH device mentioned above support a preset first BLUETOOTH version;

if both the electronic device mentioned above and the BLUETOOTH device mentioned above support the preset first BLUETOOTH version, activating a high-speed encoding function by setting a preset first flag bit to enable high-speed encoding of a physical layer, and activating a data length extension function by setting a preset second flag bit.

In a fifth possible implementation manner provided on the basis of the fourth possible implementation manner mentioned above, after the detecting whether the electronic device mentioned above and the BLUETOOTH device mentioned above support the preset first BLUETOOTH version, the processor 402 further implements the following steps by running the computer program mentioned above stored in the memory 401:

if the electronic device mentioned above and/or the BLUETOOTH device mentioned above do not support the preset first BLUETOOTH version, detecting whether the electronic device mentioned above and the BLUETOOTH device mentioned above support a preset second BLUETOOTH version, wherein the second BLUETOOTH version is lower than the first BLUETOOTH version;

if both the electronic device mentioned above and the BLUETOOTH device mentioned above support the preset second BLUETOOTH version, activating the data length extension function by setting the second flag bit.

In a sixth possible implementation on the basis of the first possible implementation mentioned above, after establishing the BLUETOOTH connection with the BLUETOOTH device, the processor 402 further implements the following steps by running the computer program mentioned above stored in the memory 401:

obtaining a maximum transmission unit size supported by the BLUETOOTH device mentioned above as a target size, the target size mentioned above is used for indicating a size of a data package transmitted by the electronic device mentioned above to the BLUETOOTH device mentioned above.

In a seventh possible implementation provided on the basis of the first possible implementation mentioned above, the second possible implementation mentioned above, the third possible implementation mentioned above, the fourth possible implementation mentioned above, the fifth possible implementation mentioned above, or the sixth possible implementation mentioned above, the updating the first rate parameter mentioned above, the first connection interval parameter mentioned above, and the second connection interval parameter mentioned above includes:

based on the second rate parameter mentioned above, updating the first rate parameter mentioned above;

based on the second connection interval parameter mentioned above, updating the first connection interval parameter mentioned above;

based on a preset connection interval unit value, updating the second connection interval parameter mentioned above.

It should be understood that, in the embodiment of the present application, the processor 402 may be a central processing unit (CPU). The processor may also be other general-purpose processors, a digital signal processor (DSP), an application specific integrated circuit (ASIC), a field-programmable gate array (FPGA), or other programmable logic devices, a discrete gate, or a transistor logic device, a discrete hardware component, etc. The general-purpose processor may be a microprocessor or the processor may be any conventional processor or the like.

The memory 401 may include a read-only memory and a random-access memory, and provide instructions and data to the processor 402. Part or all of memory 401 may also include a non-volatile random-access memory. For example, the memory 401 may also store information of device categories.

As seen from the above, in the embodiment of the present application, the electronic device determines the connection interval parameter that can achieve the maximum transmission rate by dynamically adjusting the connection interval, and after obtaining the connection interval parameter that can achieve the maximum transmission rate, the connection interval is maintained to perform BLUETOOTH data connection, so as to achieve high-speed data transmission. In addition, the maximum transmission unit size supported by the two devices can be exchanged, and the data packet can be transmitted to an opposite terminal with the maximum transmission unit size supported by the opposite terminal, which can also achieve the high-speed data transmission. Further, under the circumstances that both of the two devices support, the high-speed encoding function and the data length extension function are activated, so as to further achieve the high-speed data transmission.

Those skilled in the art can clearly understand that, for the convenience and conciseness of description, the illustration and explanation are merely performed according to the division of the above-mentioned various functional units and modules. In a practical application, the above-mentioned function can be allocated to different functional units and modules to be completed according to requirements. That is, an internal structure of the above device is divided into the different functional units or modules, so as to complete all or part of the above-mentioned functions. The various functional units and modules in the embodiment may be integrated into one processing unit, or each unit may exist physically alone, or two or more units may be integrated into one unit. The above-mentioned integrated units may be realized in the form of hardware, and can also be realized in the form of software functional units. In addition, specific names of the functional units and modules are only for the convenience of being distinguishable from each other, and are not used to limit the protection scope of the present application. For the specific working processes of the units and modules in the above-mentioned system, reference may be made to the corresponding processes in the foregoing method embodiments, which will not be repeated here.

In the above-mentioned embodiments, the description of each embodiment has its emphasis. For parts that are not described or recorded in detail in a certain embodiment, reference may be made to relevant descriptions of other embodiments.

Those skilled in the art can realize that the exemplary units and algorithm steps as described in connection with the embodiments disclosed here can be implemented by electronic hardware, or a combination of external device software and the electronic hardware. Whether these functions are performed by hardware or software depends on the specific application and design constraints of a technical solution. A skilled technician may implement the described function using different methods for each particular application, but such implementation should not be considered beyond the scope of the present application.

In the embodiments provided in the present application, it should be understood that the disclosed apparatus and method may be implemented in other manners. For example, the system embodiments described above are only illustrative. For example, the division of the above-mentioned modules or units is only a logical and functional division. In actual implementation, there may be other division methods. For example, multiple units or components may be combined or integrated into another system, or some features can be omitted or not implemented. On another hand, the shown or discussed mutual coupling, direct coupling, or communication connection may be indirect coupling or communication connection via some interfaces, devices, or units, and may be electrical, mechanical, or other forms.

The unit described above as a separate component may or may not be physically separated, and the component shown as a unit may or may not be a physical unit. That is, it may be located in one place, or may be distributed to multiple network units. Some or all of the units may be selected according to actual needs to achieve the purpose of the solution in the embodiment.

The above-mentioned integrated units, if implemented in the form of software functional units and sold or used as independent products, may be stored in a computer-readable storage medium. Based on this understanding, the present application can implement all or part of the processes in the method(s) of the above embodiments, and can also be completed by instructing associated hardware through a computer program. The above-mentioned computer program can be stored in a computer-readable storage medium. When executed by a processor, the program can implement steps of the above-mentioned various method embodiments. The above-mentioned computer program includes a computer program code, and the above-mentioned computer program code may be in the form of a source code, an object code, an executable file, or some intermediate forms. The above-mentioned computer-readable storage medium may include: any entity or device capable of carrying the above-mentioned computer program code, a recording medium, a U disk, a removable hard disk, a magnetic disk, an optical disk, a computer-readable memory, a read-only memory (ROM), random-access memory (RAM), an electric carrier signal, a telecommunication signal, and a software distribution medium, etc. It should be noted that the content contained in the above-mentioned computer-readable storage medium may be appropriately increased or decreased according to the requirements of legislation and patent practice in a jurisdiction. For example, in some jurisdictions, according to legislation and patent practice, the computer-readable storage medium does not include the electric carrier signal and telecommunication signal.

The above embodiment is only used to illustrate the technical solution(s) of the application, but not to limit it. Although the present application has been described in detail with reference to the foregoing embodiments, those skilled in the art should understand that: the technical solution recorded in the above embodiments can still be modified, or part of technical features therein can be equivalently replaced; and these modifications or replacement will not make the essence of the corresponding technical solutions depart from the spirit and scope of the technical solution of the embodiments of the present application, and should be within the protection scope of the present application.

What is claimed is:

1. A data transmission method, characterized in that the data transmission method is applied to an electronic device with a BLUETOOTH function, the data transmission method comprising:

establishing a BLUETOOTH connection with a BLUETOOTH device;

creating and initializing a first rate parameter, a second rate parameter, a first connection interval parameter, and a second connection interval parameter, wherein the first rate parameter is used to record a maximum transmission rate, and the second rate parameter is used to indicate an average transmission rate in a data transmission process; the first connection interval parameter is used to record a connection interval relating to the first rate parameter, and the second connection interval parameter is used to dynamically adjust a connection interval used in the data transmission process;

based on the second connection interval parameter, performing data transmission with the BLUETOOTH device within a preset time length, and updating the second rate parameter through the average transmission rate within the time length;

comparing the first rate parameter with the second rate parameter;

if the first rate parameter is less than the second rate parameter, updating the first rate parameter, the first connection interval parameter, and the second connection interval parameter, and returning to execute the step of performing the data transmission with the BLUETOOTH device within the preset time length, and updating the second rate parameter through the average transmission rate within the time length based on the second connection interval parameter, and following steps; and if the first rate parameter is greater than or equal to the second rate parameter, maintaining the BLUETOOTH connection with the BLUETOOTH device based on the first connection interval parameter.

2. The data transmission method as claimed in claim 1, characterized in that after the establishing the BLUETOOTH connection with the BLUETOOTH device, the data transmission method further comprises:

detecting whether it is a first time for the electronic device to establish the BLUETOOTH connection with the BLUETOOTH device;

correspondingly, the creating and initializing the first rate parameter, the second rate parameter, the first connection interval parameter, and the second connection interval parameter comprising:

if it is the first time for the electronic device to establish the BLUETOOTH connection with the BLUETOOTH device, creating and initializing the first rate parameter, the second rate parameter, the first connection interval parameter, and the second connection interval parameter; and if it is not the first time for the electronic device to establish the BLUETOOTH connection with the BLUETOOTH device, obtaining a device identification code of the BLUETOOTH device, and searching for the first connection interval parameter relating to the device identification code in local of the electronic device based on the device identification code to realize the data transmission with the BLUETOOTH device based on the first connection interval parameter.

3. The data transmission method as claimed in claim 2, characterized in that after the maintaining the BLUETOOTH connection with the BLUETOOTH device based on the first connection interval parameter, the data transmission method further comprises:

obtaining the device identification code of the BLUETOOTH device;

establishing an association relationship between the first connection interval parameter and the device identification code; and storing the association relationship.

4. The data transmission method as claimed in claim 1, characterized in that after the establishing the BLUETOOTH connection with the BLUETOOTH device, the data transmission method further comprises:

detecting whether the electronic device and the BLUETOOTH device support a preset first BLUETOOTH version; and if both the electronic device and the BLUETOOTH device support the preset first BLUETOOTH version, activating a high-speed encoding function by setting a preset first flag bit to enable high-speed encoding of a physical layer, and activating a data length extension function by setting a preset second flag bit.

5. The data transmission method as claimed in claim 4, characterized in that after the detecting whether the electronic device and the BLUETOOTH device support the preset first BLUETOOTH version, the data transmission method further comprises:

if the electronic device and/or the BLUETOOTH device do not support the preset first BLUETOOTH version, detecting whether the electronic device and the BLUETOOTH device support a preset second BLUETOOTH version, wherein the second BLUETOOTH version is lower than the first BLUETOOTH version; and if both the electronic device and the BLUETOOTH device support the preset second BLUETOOTH version, activating the data length extension function by setting the second flag bit.

6. The data transmission method as claimed in claim 1, characterized in that after the establishing the BLUETOOTH connection with the BLUETOOTH device, the data transmission method further comprises:

obtaining a maximum transmission unit size supported by the BLUETOOTH device as a target size, the target size used for indicating a size of a data package transmitted by the electronic device to the BLUETOOTH device.

7. The data transmission method as claimed in claim 1, characterized in that the first rate parameter, the second rate parameter, and the first connection interval parameter are all initialized to 0, and the second connection interval parameter is initialized to a preset minimum value of a connection interval parameter.

8. The data transmission method as claimed in claim 1, characterized in that the updating the first rate parameter, the first connection interval parameter, and the second connection interval parameter comprises:

based on the second rate parameter, updating the first rate parameter;

based on the second connection interval parameter, updating the first connection interval parameter; and based on a preset connection interval unit value, updating the second connection interval parameter.

9. The data transmission method as claimed in claim 8, characterized in that the based on the second rate parameter, updating the first rate parameter comprises:

assigning a value of the second rate parameter to the first rate parameter, so as to make a value of an updated first rate parameter equal to the value of the second rate parameter;

the based on the second connection interval parameter, updating the first connection interval parameter comprises:

assigning a value of the second connection interval parameter to the first connection interval parameter, so as to make a value of an updated first connection interval parameter equal to the value of the second connection interval parameter; and the based on the preset connection interval unit value, updating the second connection interval parameter comprises:

adding the value of the second connection interval parameter and the connection interval unit value to obtain an updated second connection interval parameter.

10. An electronic device, comprising a memory, a processor, and a computer program stored in the memory and running on the processor, and characterized in that the processor implements following operations when executing the computer program:

establishing a BLUETOOTH connection with a BLUETOOTH device;

creating and initializing a first rate parameter, a second rate parameter, a first connection interval parameter, and a second connection interval parameter, wherein the first rate parameter is used to record a maximum transmission rate, and the second rate parameter is used to indicate an average transmission rate in a data transmission process; the first connection interval parameter is used to record a connection interval relating to the first rate parameter, and the second connection interval parameter is used to dynamically adjust a connection interval used in the data transmission process;

based on the second connection interval parameter, performing data transmission with the BLUETOOTH device within a preset time length, and updating the second rate parameter through the average transmission rate within the time length;

comparing the first rate parameter with the second rate parameter;

if the first rate parameter is less than the second rate parameter, updating the first rate parameter, the first connection interval parameter, and the second connection interval parameter, and returning to execute the step of performing the data transmission with the BLUETOOTH device within the preset time length, and updating the second rate parameter through an average transmission rate within the time length based on the second connection interval parameter, and following steps; and if the first rate parameter is greater than or equal to the second rate parameter, maintaining the BLUETOOTH connection with the BLUETOOTH device based on the first connection interval parameter.

11. The electronic device as claimed in claim 10, characterized in that after the establishing the BLUETOOTH connection with the BLUETOOTH device, the processor further implements the following operations when executing the computer program:

detecting whether it is a first time for the electronic device to establish the BLUETOOTH connection with the BLUETOOTH device;

correspondingly, the creating and initializing the first rate parameter, the second rate parameter, the first connection interval parameter, and the second connection interval parameter comprising:

if it is the first time for the electronic device to establish the BLUETOOTH connection with the BLUETOOTH device, creating and initializing the first rate parameter, the second rate parameter, the first connection interval parameter, and the second connection interval parameter; and if it is not the first time for the electronic device to establish the BLUETOOTH connection with the BLUETOOTH device, obtaining a device identification code of the BLUETOOTH device, and searching for the first connection interval parameter relating to the device identification code in local of the electronic device based on the device identification code, to realize the data transmission with the BLUETOOTH device based on the first connection interval parameter.

12. The electronic device as claimed in claim 11, characterized in that after the maintaining the BLUETOOTH connection with the BLUETOOTH device based on the first connection interval parameter, the processor further implements the following operations when executing the computer program:

obtaining the device identification code of the BLUETOOTH device;

establishing an association relationship between the first connection interval parameter and the device identification code; and storing the association relationship.

13. The electronic device as claimed in claim 10, characterized in that after the establishing the BLUETOOTH connection with the BLUETOOTH device, the processor further implements the following operations when executing the computer program:

detecting whether the electronic device and the BLUETOOTH device support a preset first BLUETOOTH version; and if both the electronic device and the BLUETOOTH device support the preset first BLUETOOTH version, activating a high-speed encoding function by setting a preset first flag bit to enable high-speed encoding of a physical layer, and activating a data length extension function by setting a preset second flag bit.

14. The electronic device as claimed in claim 13, characterized in that after the detecting whether the electronic device and the BLUETOOTH device support the preset first BLUETOOTH version, the processor further implements the following operations when executing the computer program:

if the electronic device and/or the BLUETOOTH device do not support the preset first BLUETOOTH version, detecting whether the electronic device and the BLUETOOTH device support a preset second BLUETOOTH version, wherein the second BLUETOOTH version is lower than the first BLUETOOTH version; and if both the electronic device and the BLUETOOTH device support the preset second BLUETOOTH version, activating the data length extension function by setting the second flag bit.

15. The electronic device as claimed in claim 10, characterized in that after the establishing the BLUETOOTH connection with the BLUETOOTH device, the processor further implements the following operations when executing the computer program:

obtaining a maximum transmission unit size supported by the BLUETOOTH device as a target size, the target size used for indicating a size of a data package transmitted by the electronic device to the BLUETOOTH device.

16. The electronic device as claimed in claim 10, characterized in that when the processor executes the computer program, the first rate parameter, the second rate parameter, and the first connection interval parameter are all initialized to 0, and the second connection interval parameter is initialized to a preset minimum value of a connection interval parameter.

17. The electronic device as claimed in claim 10, characterized in that when the processor executes the computer program, the updating the first rate parameter, the first connection interval parameter, and the second connection interval parameter comprises:

based on the second rate parameter, updating the first rate parameter;

based on the second connection interval parameter, updating the first connection interval parameter; and based on a preset connection interval unit value, updating the second connection interval parameter.

18. The electronic device as claimed in claim 17, characterized in that when the processor executes the computer program, the based on the second rate parameter, updating the first rate parameter comprises:

assigning a value of the second rate parameter to the first rate parameter, so as to make a value of an updated first rate parameter equal to the value of the second rate parameter;

the based on the second connection interval parameter, updating the first connection interval parameter comprises:

assigning a value of the second connection interval parameter to the first connection interval parameter, so as to make a value of an updated first connection interval parameter equal to the value of the second connection interval parameter; and the based on the preset connection interval unit value, updating the second connection interval parameter comprises:

adding the value of the second connection interval parameter and the connection interval unit value to obtain an updated second connection interval parameter.

19. A computer-readable storage medium, the computer-readable storage medium storing a computer program characterized in that when executed by a processor, the computer program implements a data transmission method, the data transmission method comprising:

establishing a BLUETOOTH connection with a BLUETOOTH device;

creating and initializing a first rate parameter, a second rate parameter, a first connection interval parameter, and a second connection interval parameter, wherein the first rate parameter is used to record a maximum transmission rate, and the second rate parameter is used to indicate an average transmission rate in a data transmission process; the first connection interval parameter is used to record a connection interval relating to the first rate parameter, and the second connection interval parameter is used to dynamically adjust a connection interval used in the data transmission process;

based on the second connection interval parameter, performing data transmission with the BLUETOOTH device within a preset time length, and updating the second rate parameter through the average transmission rate within the time length;

comparing the first rate parameter with the second rate parameter;

if the first rate parameter is less than the second rate parameter, updating the first rate parameter, the first connection interval parameter, and the second connection interval parameter, and returning to execute the step of performing the data transmission with the BLUETOOTH device within the preset time length, and updating the second rate parameter through the average transmission rate within the time length based on the second connection interval parameter, and following steps; and if the first rate parameter is greater than or equal to the second rate parameter, maintaining the BLUETOOTH connection with the BLUETOOTH device based on the first connection interval parameter.

20. The computer-readable storage medium as claimed in claim 19, characterized in that after the establishing the BLUETOOTH connection with the BLUETOOTH device, the data transmission method further comprises:

detecting whether it is a first time for the electronic device to establish the BLUETOOTH connection with the BLUETOOTH device;

correspondingly, the creating and initializing the first rate parameter, the second rate parameter, the first connection interval parameter, and the second connection interval parameter comprising:

if it is the first time for the electronic device to establish the BLUETOOTH connection with the BLUETOOTH device, creating and initializing the first rate parameter, the second rate parameter, the first connection interval parameter, and the second connection interval parameter; and if it is not the first time for the electronic device to establish the BLUETOOTH connection with the BLUETOOTH device, obtaining a device identification code of the BLUETOOTH device, and searching for the first connection interval parameter relating to the device identification code in local of the electronic device based on the device identification code to realize the data transmission with the BLUETOOTH device based on the first connection interval parameter.

* * * * *